US006578151B1

(12) United States Patent
Nilsen

(10) Patent No.: US 6,578,151 B1
(45) Date of Patent: Jun. 10, 2003

(54) ARRANGEMENT IN A DATA COMMUNICATION SYSTEM

(75) Inventor: Børge Nilsen, Oslo (NO)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/138,634

(22) Filed: Aug. 24, 1998

(30) Foreign Application Priority Data

Sep. 2, 1997 (NO) ................................................. 974028

(51) Int. Cl.[7] ................................................. H04L 9/00
(52) U.S. Cl. ..................................................... 713/201
(58) Field of Search ............................... 713/200, 201, 713/202; 709/225, 229

(56) References Cited

U.S. PATENT DOCUMENTS

| 5,550,984 A | * | 8/1996 | Gelb ........................... 709/245 |
| 5,623,601 A | * | 4/1997 | Vu ............................... 713/201 |
| 5,825,880 A | * | 10/1998 | Sudia et al. .................. 380/21 |
| 5,826,014 A | * | 10/1998 | Coley et al. ................. 713/201 |
| 5,892,902 A | * | 4/1999 | Clark ........................... 713/201 |
| 5,896,499 A | * | 4/1999 | McKelvey ................... 713/201 |
| 5,999,973 A | * | 12/1999 | Glitho et al. ................. 709/223 |
| 6,061,798 A | * | 5/2000 | Coley et al. ................. 713/201 |
| 6,170,058 B1 | * | 1/2001 | Kausik ......................... 713/193 |

FOREIGN PATENT DOCUMENTS

WO    WO 97/00471    1/1997

* cited by examiner

Primary Examiner—Dieu-Minh Le
(74) Attorney, Agent, or Firm—Jenkens & Gilchrist, PC

(57) ABSTRACT

The present invention relates to an arrangement a data communication system, wherein users, managers and/or machines (actors) intercommunicate via ports, especially comprising a Transport Service Access Port (TSAP) comprising port number and Internet Protocol (IP) address, which ports communicate through firewalls by means of firewall classification/logic which is controlled by a bastion host therefor, and in order to resolve security issues related to such network, it is according to the present invention suggested that said bastion host is configured to accept digitally signed configuration messages from one of more distributed operator(s) and/or manager(s), for thereby ensuring intergrity of said configuration messages.

30 Claims, 1 Drawing Sheet

ARRANGEMENT IN A DATA COMMUNICATION SYSTEM

FIELD OF INVENTION

The present invention relates to network security issues and a set of problems with management and control of firewalls, in particular pertaining to firewalling of applications utilizing dynamic port allocation.

More specifially, the present invention relates to an arrangement in a data communication system as stated in the preamble of the attached patent claim 1.

PROBLEM AREAS

Problem 1

The most basic firewall functions are based on packet filter functions which perform screening on a (statically) configured set of allowed address pairs (incl. port numbers). These firewall functions are simple for reasons of cost, performance and management. The simplicity of these firewalls do however introduce a set of problems for applications that use dynamic allocation of ports (in particular UDP ports).

To solve these problems of dynamic port allocation, application proxy functions have been developed and placed on firewalls. These proxies interpret the application protocol and enforce control functions at the application layer as well as supporting the network and transport layer control functions (e.g. by reconfiguring the packet filter to allow traffic between a new set of address pairs).

The problem with this approach is that for every new application an application proxy has to be developed and placed on the firewalls. These proxies do also, in most configurations, introduce added delay and latency for the data transferred (not using cut-through). The proposed solution presents a generic solution to the described set of problems.

Problem 2

Current packet filter firewalls base their screening on address pairs and not on the end users working behind those addresses. This means that credentials are allocated to terminals and not to the end users. The proposed solution binds a user identity to an IP address and then performs screening based on the address pairs.

The described problem (and the solution) has even higher relevance in networks that employ dynamic address allocation schemes, such as the DHCP protocol.

PRIOR ART SOLUTIONS AND PROBLEMS WITH THESE

W3C: PICS, Platform for Internet Content Selection & DSig, Digitial Signature Initiative W3C standardization address digitally signed information elements, but does not propose the mechanism used for this purpose. Rather, they suggests that the firewall can control the signatures before allowing the information to pass the firewall domain.

IETF RFC: 1928, 1929, 1961, SOCKS-v5

The following set of RFC defines a set of mechanims to employ for application proxying applications which use UDP ports (SOCKS-v4 handled TCP applications only).

IEFT draft: Firewall support for mobile IP

The draft propose a mechanism for allowing a mobile host to traverse a firewall based on using IPsec (SKIP). This means that the application protocol has to be encrypted and/or authenticated (which also implies added delay and latency for transferred data).

OBJECTS OF THE INVENTION

The main object of the present invention is to provide an arrangement in a data communication system wherein security issues can be substantially improved.

Another object of the present invention is to provide an arrangement allowing for generic mechanizms for firewalling applications.

Another object of the present invention is to provide an arrangement which favourably allows distributed control of firewall between configured and authorised actors, for thereby providing user mobility.

Another object of the present invention is to provide an arrangement allowing for integrity controlled and signed configuration and management as well signed log of operations.

Another object of the present invention is to provide an arrangement wherein firewall functions are related to identity of service user rather than user location, i.e. machine address.

Yet another object of the present invention is to provide an arrangmemt giving better support and control of mobile users and their access to firewalled domains.

An object of the present invention is also to provide an arrangement giving a simple non-repudiation service for service usage.

SUMMARY OF THE INVENTION

These objects are achieved in an arrangement of the type as stated in the preamble, which arrangement according to the present invention is characterized by the features as stated in the characterizing clause of enclosed patent claim 1.

Further features and advantages of the present invention will appear from the following description taken in conjuction with the enclosed drawings, as well as from the further enclosed patent claims.

BRIEF DISCLOSURE OF THE DRAWINGS

DETAILED DESCRIPTION OF EMBODIMENTS

Figure 1:
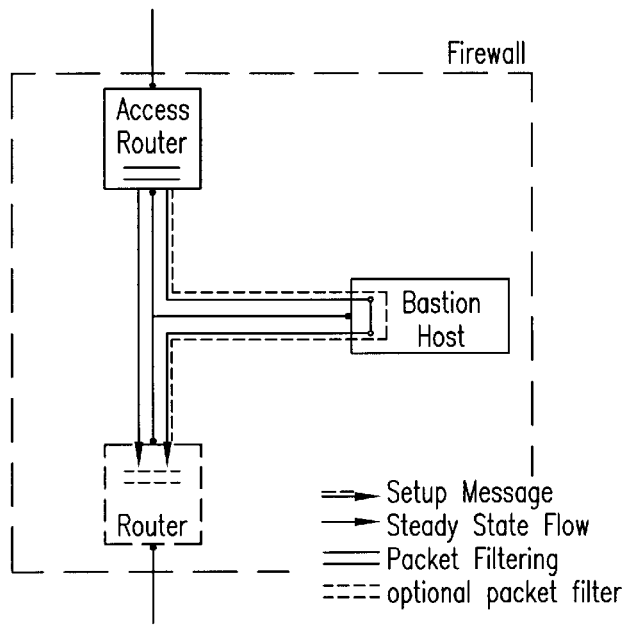
FIG. 1 is a schematic block diagram illustrating a basic firewall architecture comprising main elements thereof.

In connection with the enclosed FIG. 1 which schematically illustrates a firewall architecture, there will now be disclosed an embodiment of the present invention which represents a solution to the previous discussed problem 1.

The proposed solution describes a mechanisms for providing distributed management of firewall functions and for allowing firewall ports to be dynamically opened and closed according to authorised service usage. The solution is based on X.509 based authentication of users, managers and/or machines (hereafter called actors).

The firewall is configured with information about the credentials of the actors. These credentials controls the rights of an actor within the authorised domain. This means that an actor is authenticated and thereafter delegated rights on the system. An example of such a right could be the right to open the firewall packet filter for an application at a given time.

BASIC FIREWALL ARCHITECTURE

The firewall should work as an application layer proxy during call setup and as a packet filter during steady state. This gives high level of control when calls are accepted and minimum delay (processing) during steady state. In other words, the application firewalling is only active during call setup and gets out of the way when traffic flows (i.e. cut-through mode of operation).

Signed configuration

The bastion host is configured to accept configuration messages from a configured set of actors (machines and/or users). To ensure the integrity of these configuration messages, they are digitally signed (cf. X.509 standard). Received configuration messages are logged and events distributed to a configured list of receivers. This allows the firewall configuration to:

a. be distributed and
b. be integrity controlled (or backlogged if required).

Static configuration (Base configuration)

With the use of signed configuration (presented above) an operator can from a remote location request the bastion host to update the packet filter (e.g. allow traffic between a new set of address pairs). The firewall will receive this signed configuration request and:

1. validate the signature
2. validate the operator credentials (i.e. is the operation allowed for this operator)
3. carry out the requested configuration activity
4. send the signed configuration message (event service) to a listed set of receivers
5. log the signed configuration message Option To alleviate the firewalls from the need to know the profile and credentials of all operators, there can be (a set of) centrally placed control function(s). These control functions validate the requested operations (operator profile and credentials), resigns the operations and forwards them to the firewalls. This means that the operation of the firewalls become simpler as they only need to control the signature of this single control function.

Avoiding replay attacks

To avoid replay attacks with signed configuration messages, the messages shall be stamped with the system time. To allow for clock-drift/syncronisation problems, the receiving and validating function should allow messages within a "time-window" and therefore needs to be able to buffer all messages within the limit of this "time-window" (cf. replay attacks).

Logging and tracing

All operations carried out on the firewall will be digitally signed and logged. This means that it will be possible to monitor all operations carried out by the individual operators. This provides a new set of advances to firewall management, including:

1. the operators can be given different rights for management of the firewalls
2. the management can be distributed between a set of operators
3. the performance of the individual operator can be traced (e.g. scheduling training)
4. errors can be traced back to the source; configuration message and operator Description of solution to problem 2

The user of the network and the services are equipped with a X.509 certificate issued for their identity and use this for authentication with the network. This provides strong authentication based on sound cryptographic mechanisms. The users and managers of these networks authenticate themselves with the remote resources and get credentials (i.e. rights) within the systems for management and service usage.

With the suggested solution the user is bound to a TSAP (Transport Service Access Point) address (e.g. IP address) when he/she is authenticated. This binding should thereafter be used as a complement for the firewall functions. This means that although a user may break into a server, he/she may still not traverse the firewalls or break into machines (e.g. by jumping from host to host by means of .rhost configuration will become impossible).

PROPOSED SOLUTIONS

The user (or its host terminal) cryptographically signs a structured set of information that binds the user to a given TSAP address at a given instance. The set of signed data includes:

1. the X.509 certificate identity (CA-Id+Serial no.)
2. the TSAP address (IP address) and
3. the system time (potentially retrieved from a system time source)

The set of data is signed by the users private key (of the asymetric key pair), a process that proves that the data was generated by the given user.

The receiver of the signed data shall perform the following processing steps:

1. validate the signature
2. validate that the system time is within a defined time-window
3. optionally, adds its ID and resign the data (proof of validation process)
4. log the signed proof of userId—TSAP address mapping A further detailed description of embodiments according to the present invention will now be given with reference to FIG. 2.

In other words, in connection with FIG. 2 there will be given a high level description of a firewall architecture with a modular architecture for remote/distributed management and added security functions, according to the present invention.

Figure 2:
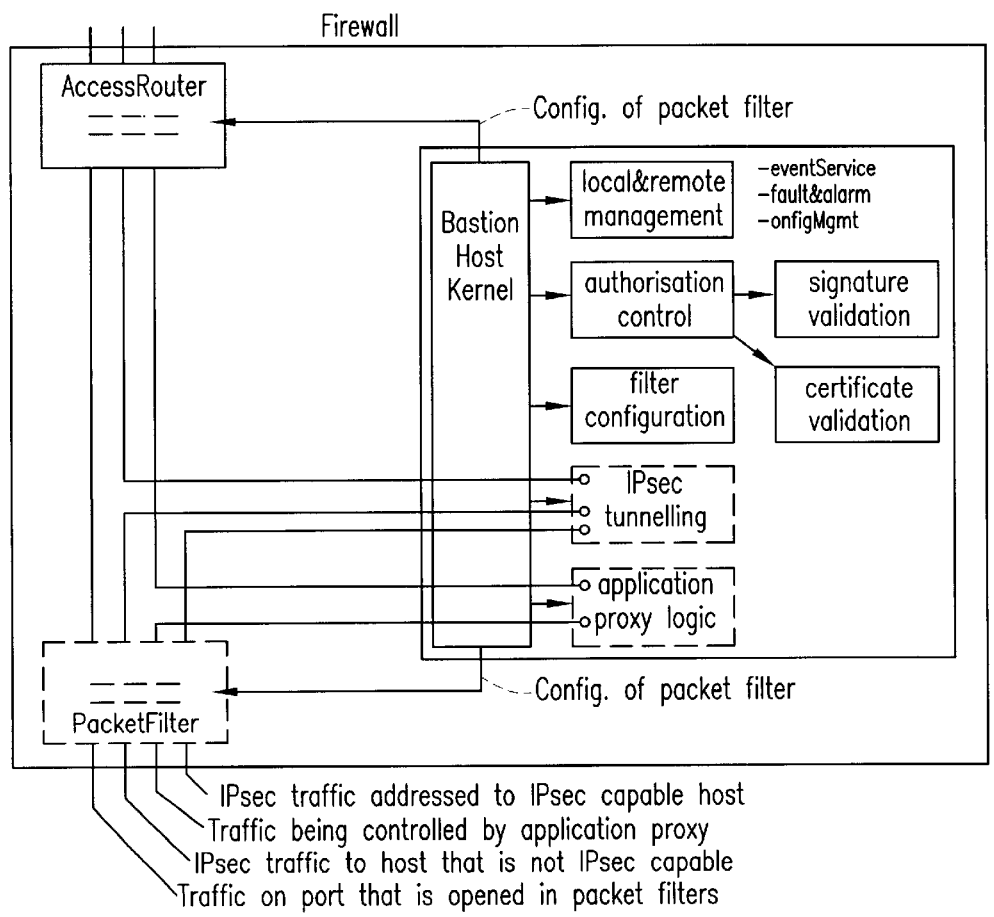
FIG. 2 is a schematic block diagram of a firewall architecture, comprising a modular architecture for remote/distributed management and added security functions, according to the present invention.

As appearing from FIG. 2, the bastion host is configured to accept management messages (e.g. configuration) from a set of X.509 defined actors. Messages from these actors shall be digitally signed, such that:

management operations are traceable
location of manager is of no significance (cf. user mobility)
if required, several managers can operate the firewall in concert All management messages shall be digitally signed and comply to the principles of a "one-time service ticket". This ensures that management messages are only valid once and thus cannot be replayed.

Example of valid (configured managers) are:

{$broker_A$, $broker_B$, $gatekeeper_A$, $localMgr_x$, $remoteMGr_x$}

It should be noted that this is an example—it may not be advisable to allow operators from different domains to work on the same FW. It is also possible to make distinctions between the credentials (=rights) of the different operators/managers.

Configuration and management events are logged and distributed to a defined set of manager locations. Routines for alarm handling should be possible to define, such as closing down network access.

Separate data paths shall exist to the bastion host in order to handle clogging attacks (i.e. attacks that aims at blocking out mgmt. access). This can be provided by a) PVC with reserved bandwidth or b) data encryption modem access to bastion host.

DISTRIBUTED MANAGEMENT refers to equipment management being shared between a set of operators where the authentication and authorisation principles are bound to the operator identity (and not the management terminals). The distributed management is based on strong authentication and authorisation of operators/users and digitial signature mechanisms, all as provided by a Public Key Infrastructure (PKI) and sound cryptographic mechanisms.

The equipment is controlled and managed by a defined set of operators with a defined set of rights (=credentials). These rights are enforced by using the PKI and X.509 certificates. To ensure that operations cannot be faked, replayed or modified, digitally signed message tokens are used. The message tokens utilise message time stamping to avoid replay attacks. To remove strong clock synchronisation needs, tokens are buffered according to a defined time window which corresponds to the allowed clock drift.

AUTHORISATION CONTROL

Authorisation control refers to granting a set of operators credentials for management of the equipment and enforcing these rules (i.e. relies on proper authentication). Note that the defined set of operators may have differents credentials (=rights), e.g. whereas all may have the right to read the logs only one of them may have the right to configure the firewall.

Distributed Authorisation Control—means that all the access control mechanisms are interpreted (and enforced) locally on the firewall. The firewall itself authenticate the individual operators and give them credentials based on their identity and a configured set of operator profiles.

- the authentication shall be strong and based on X.509 certificates
- the local equipment shall use local data and local authorisation procedures to verify that the user is a valid operator and to delegate the operator his/her credentials.

Centralised Authorisation Control—refers to an architecture where there is one central broker function (could be replicated) which authenticates the operators and grants them credentials. The local equipment thus validates the broker instead of the operator.

- the authentication shall be strong and based on X.509 certificates
- authorisation of operators and delegation of operator credentials is done by a service broker which is separate from the local equipment
- the local equipment shall authenticate and autho rise the broker(s) and verify the integrity of the delegated credentials by means of digitial signatures.

AUDIT CONTROL EVENT MANAGEMENT AND BACKLOGGING OPERATIONS

Security audits, events and logging of performed operations are all important functions for controlling the operation and behaviour of a firewall. All configuriation activities and detected "potential" attacks should be reported according to the following:

Alarm and event Receivers—is a list of addresses where to send alarms and events. The addresses could be either TSAP addresses, DNS names or X.500 names. Operators should be notified with events when they are added/removed to/from the list.

Alarm and Event Distribution Center—is an alternative address of where to send alarms. The center would then be reponsible for distributing the alarms and events to the appropriate operators and/or operator position.

Signed Configuration Messages—should be logged and events should be sent to the configured list of event receivers. As configuration messages are digitially signed and logged it will be possible to trace back mis-configurations to individual operators.

STATIC CONFIGURATON AND RULES refers to the basic address configuration of the firewall, including rules for which ports that shall be statically open in each direction. The set should ideally be as small as possible with dynamic allocation (opening) of ports based on controlled access to services.

The static configuration should ideally only allow access to the access control servers in the public domain (=brokers). Further access to services should be according to the brokered set of services where strong authentication and authorisation mechanisms are applied together with events, alarms and resource management functions.

DYNAMIC CONFIGURATION AND RULES referes to the principles used for dynamically opening and closing firewall ports. Firewall ports and addresses should be opened and closed as a result of brokered service sessions. The brokering of these service sessions should further be based on sound principles for authorisation and access control per end-user and not per terminal (=IP address) as now.

INTEGRITY CONTROL AND CODE SIGNING

The firewall will be capable of validating digitally signed messages (blocks of data). This capability should be used for validating the integrity of signed data messages when they cross the firewall domain. This applies in particular to the integrity of active data elements such as applet code (email integrity control would not be recommended).

IPsec SUPPORT

The firewall should also be capable of supporting IPsec bridging functions. This would allow the firewall to set up IPsec Security Associations betweeen the firewalled domain and remote sites and/or hosts.

As appearing from the present description the present invention offers a series of advantages compared with prior art technique.

These advantages may be summarized as follows:

Commercial aspects

The configuration messages are digitally signed which means that they are not subjected to export/import regulations in the same manner as data encryption is. This does not mean that data encryption can not be used in addition, if allowed and required.

Advantages

The solution provides the following set of advantages:

Generic mechanisms for firewalling applications as opposed to application specific proxies Distributed control of firewall between configured and authorised actors. The authorisation is based on actors identity and not their placement in the net. (i.e. user mobility is provided).

Integrity controlled and signed configuration and management plus signed log of operations (e.g. backlogging).

Firewall functions related to identity of service user rather than user location, i.e. machine address.

Better support and control of mobile users and their access to firewalled domains A simple non-repudiation service for service usage

What is claimed is:

1. An arrangement in a data communication system, the arrangement comprising:
  a plurality of ports that communicate via firewall classification/logic;
  a bastion host adapted to control the firewall classification/logic;
  wherein said bastion host is adapted to utilize a public key infrastructure and accept digitally signed configuration messages from at least one distributed actor;
  wherein said bastion host is adapted to ensure, via the digitally signed configuration messages, that the at least one distributed actor is trusted; and
  wherein said bastion host is adapted to permit remote firewall configuration by the at least one trusted distributed actor.

2. The arrangement as claimed in claim 1, wherein said digitally signed received configuration messages are logged in a configured list of receivers.

3. The arrangement as claimed in claim 1, wherein, as a consequence of said digitally signed and received configuration messages, events are distributed to a configured list of receivers.

4. The arrangement as claimed in claim 1, wherein said bastion host is configured to allow a selection between a dynamic distributed operator and a base configuration including a default packet filter configuration pertaining to a statically configured set of trusted hosts.

5. The arrangement as claimed in claim 1, wherein said bastion host is configured to receive from a remote location a signed request to update a packet filter thereof, thereby allowing traffic between a new set of address pairs.

6. The arrangement as claimed in claim 5, wherein, when a firewall receives said signed request, the firewall performs at least one of the following:
  a) validate the signature;
  b) validate the operator credentials;
  c) carry out the requested configuration activity;
  d) send the signed configuration message (event service) to a listed set of receivers; and
  e) log the signed configuration message.

7. The arrangement as claimed in claim 1, wherein said digitally signed configuration messages are each provided with a time stamp to ensure that said digitally signed configuration messages are valid only once.

8. The arrangement as claimed in claim 7, wherein said digitally signed configuration messages are each controlled in a firewall within a time window and said firewall is designed to buffer all messages within the limit of said time window.

9. The arrangement as claimed in claim 7, wherein a sliding time window and buffer are used to compensate for any problems related to clock-drift/synchronization.

10. The arrangement as claimed in claim 1, wherein said digitally signed configuration messages are equipped with a specific certificate issued for identity and authentication.

11. The arrangement as claimed in claim 1, wherein:
  a user is bound to a machine address, the machine address including an NSAP ("Network Service Access Point") address, when the user is authenticated; and
  the binding is used as a complement for firewall functions.

12. The arrangement as claimed in claim 11, wherein said bastion host is configured such that the user cryptographically signs a structured set of information that binds the user to a given address at a given instance, the set of signed data comprising at least one of:
  a) the X.509 certificate identity;
  b) the NSAP address; and
  c) the system time.

13. The arrangement as claimed in claim 12, wherein, upon receipt of the signed data from the user, at least one of the following steps is selectively performed:
  a) validate the signature,
  b) validate that the system time is within a defined time-window;
  c) optionally, add an ID of the user and resign the data; and
  d) log the signed proof of userId—NSAP address mapping.

14. The arrangement as claimed in claim 4, wherein said bastion host is configured to include a default packet filter configuration pertaining to a statistically set of trusted hosts.

15. The arrangement as claimed in claim 10, wherein the certificate includes an X.509 certificate.

16. The arrangement as claimed in claim 11, wherein the machine address includes at least one of the following:
  a Network Service Access Point address; and
  an Internet Protocol address.

17. The arrangement as claimed in claim 1, wherein the public key infrastructure includes certificates, trust relationships, and cryptographic mechanisms.

18. A method of permitting remote firewall configuration, the method comprising the steps of:
  configuring a bastion host to utilize a public key infrastructure; and
  accepting, by the bastion host, of at least one digitally signed configuration message from at least one distributed actor;
  ensuring, by the bastion host via the at least one digitally signed configuration message, that the at least one distributed actor is trusted; and
  permitting remote firewall configuration by the at least one trusted distributed actor.

19. The method as in claim 18, comprising logging in a configured list of receivers, said digitally signed received configuration messages selectively including at least one distributed actor.

20. The method as claimed in claim 18, comprising, as a consequence of said digitally signed and received configuration messages, creating distributed events to a configured list of receivers.

21. The method as in claim 18, including configuring said bastion host to allow a selection between a dynamic distributed operator and a base configuration including a default packet filter configuration pertaining to a statically configured set of trusted hosts.

22. The method as in claim 18, including configuring said bastion host to receive from a remote location a signed request to update a packet filter thereof, thereby allowing traffic between a new set of address pairs.

23. The method as in claim 22, including performing, when a firewall receives said signed request, the following steps:
  a) validate the signature;
  b) validate the operator credentials;
  c) carry out the requested configuration activity;
  d) send the signed configuration message (event service) to a listed set of receivers, and
  e) log the signed configuration message.

24. The method as in claim 18, including providing each said digitally signed configuration messages with a time stamp to ensure that said digitally signed messages are valid only once.

25. The method as in claim 24, including selectively controlling said digitally signed configuration messages in a firewall within a time window and causing said firewall to buffer all messages within the limit of the time window.

26. The method in claim 24, including using a sliding time window and buffer to compensate for any problems related to clock-drift/synchronization.

27. The method in claim 18, including equipping said digitally signed configuration messages with a specific certificate issued for identity and authentication.

28. The method as in claim 18, including binding a user to a machine address including Network Service Access Point address, the binding also being used as a complement for the firewall functions.

29. The method as in claim 28, including configuring said bastion host such that an associated host terminal cryptographically signs a structured set of information that binds the user to a given address at a given instance, the set of signed data comprising:
  a) the X.509 certificate identity;
  b) the NSAP address; and
  c) The system time.

30. The method as in claim 29, including, in response to receipt of the signed data, selectively performing at least one of the following steps:
  a) validate the signature;
  b) validate that the system time is within a defined time-window;
  c) optionally, add an ID of the user and resign the data; and
  d) log the signed proof of userId—NSAP address mapping.

* * * * *